(12) United States Patent
Negrea et al.

(10) Patent No.: US 10,540,511 B2
(45) Date of Patent: Jan. 21, 2020

(54) INFORMATION RIGHTS MANAGEMENT OFFLINE FILE ACCESS FACILITY

(71) Applicant: Synchronoss Technologies, Inc., Bridgewater, NJ (US)

(72) Inventors: Alex Negrea, Bucharest (RO); Constantin Miroslav, Bucharest (RO); Ion Andrei Rînea, Bucharest (RO)

(73) Assignee: Intralinks, Inc., New York, NY (US)

( * ) Notice: Subject to any disclaimer, the term of this patent is extended or adjusted under 35 U.S.C. 154(b) by 340 days.

(21) Appl. No.: 15/473,958

(22) Filed: Mar. 30, 2017

(65) Prior Publication Data

US 2017/0286711 A1    Oct. 5, 2017

Related U.S. Application Data

(60) Provisional application No. 62/316,331, filed on Mar. 31, 2016.

(51) Int. Cl.
  *G06F 21/62*    (2013.01)
  *H04L 29/06*    (2006.01)
  *G06F 21/10*    (2013.01)

(52) U.S. Cl.
  CPC ........ *G06F 21/6218* (2013.01); *G06F 21/105* (2013.01); *H04L 63/0428* (2013.01); *H04L 63/08* (2013.01); *H04L 2463/082* (2013.01)

(58) Field of Classification Search
  CPC .................................................. G06F 21/6218
  USPC ........................................................... 726/7
  See application file for complete search history.

(56) References Cited

U.S. PATENT DOCUMENTS

| 6,981,262 | B1* | 12/2005 | DeMello | G06F 21/10 719/310 |
| 6,996,720 | B1* | 2/2006 | DeMello | G06F 21/10 713/189 |
| 7,562,395 | B2* | 7/2009 | DeMello | G06F 21/10 705/51 |
| 7,707,643 | B2* | 4/2010 | DeMello | G06F 21/10 726/27 |
| 7,861,306 | B2* | 12/2010 | DeMello | G06F 21/10 380/201 |
| 7,979,700 | B2* | 7/2011 | Elazar | G06F 21/10 348/558 |
| 8,032,943 | B2* | 10/2011 | DeMello | G06F 21/10 726/26 |

(Continued)

*Primary Examiner* — Dant B Shaifer Harriman
(74) *Attorney, Agent, or Firm* — Moser Taboada (57) ABSTRACT

Systems and methods for providing secure offline file access utilizing information rights management (IRM) are provided herein. In some embodiments, the method may comprise storing one or more IRM-protected documents in a secure local storage on a user device; storing one or more consumption licenses associated with the one or more IRM-protected documents in the secure local storage on the user device, wherein the one or more consumption licenses is required to access one or more IRM-protected documents; detecting a loss of network connectivity on the user device; writing the one or more consumption licenses to an IRM location in memory on the user device; receiving a request to open a document of the one or more IRM-protected documents; reading the consumption license from the IRM location in memory; and enabling access to the requested IRM-protected document based on the consumption license.

20 Claims, 5 Drawing Sheets

(56) References Cited

U.S. PATENT DOCUMENTS

| | | | | |
|---|---|---|---|---|
| 8,613,103 B2* | 12/2013 | Holtzman | ............ | G06F 12/1483 726/17 |
| 8,639,939 B2* | 1/2014 | Holtzman | ............. | H04L 9/3228 713/173 |
| 9,594,751 B1* | 3/2017 | Gill | ........................ | G06Q 30/00 |
| 9,613,190 B2* | 4/2017 | Ford | ..................... | G06F 21/10 |
| 9,762,553 B2* | 9/2017 | Ford | ..................... | G06F 21/10 |
| 2004/0039932 A1* | 2/2004 | Elazar | .................... | G06F 21/10 726/26 |
| 2005/0108556 A1* | 5/2005 | DeMello | ................. | G06F 21/10 713/189 |
| 2005/0188228 A1* | 8/2005 | DeMello | ................. | G06F 21/10 726/5 |
| 2006/0053079 A1* | 3/2006 | Edmonson | ............... | G06F 21/10 705/59 |
| 2006/0080535 A1* | 4/2006 | Elazar | .................... | G06F 21/10 713/176 |
| 2006/0190621 A1* | 8/2006 | Kamperman | ............ | G06F 21/10 709/245 |
| 2007/0282751 A1* | 12/2007 | Zhang | ................... | G06Q 10/00 705/57 |
| 2008/0010449 A1* | 1/2008 | Holtzman | ............ | G06F 21/445 713/157 |
| 2008/0010450 A1* | 1/2008 | Holtzman | ............. | H04L 9/3228 713/157 |
| 2008/0010451 A1* | 1/2008 | Holtzman | ............. | H04L 9/3228 713/158 |
| 2008/0010452 A1* | 1/2008 | Holtzman | ............. | H04L 9/3228 713/158 |
| 2009/0293116 A1* | 11/2009 | DeMello | ................. | G06F 21/10 726/17 |
| 2010/0212022 A1* | 8/2010 | Greevenbosch | ........ | G06F 21/10 726/27 |
| 2011/0271354 A1* | 11/2011 | Elazar | .................... | G06F 21/10 726/26 |
| 2014/0165193 A1* | 6/2014 | El-Rafei | ............. | G06F 11/0715 726/22 |
| 2015/0310188 A1* | 10/2015 | Ford | ....................... | G06F 21/10 726/28 |
| 2015/0326901 A1* | 11/2015 | Tiraspolsky | ......... | H04N 21/472 725/31 |
| 2017/0142076 A1* | 5/2017 | Ford | ....................... | G06F 21/10 |

\* cited by examiner

INFORMATION RIGHTS MANAGEMENT OFFLINE FILE ACCESS FACILITY

CROSS REFERENCE TO RELATED APPLICATIONS

This application claims benefit of U.S. Provisional Application Ser. No. 62/316,331, filed Mar. 31, 2016, which is herein incorporated by reference in its entirety.

BACKGROUND OF THE INVENTION

Field of the Invention

Embodiments of the present invention relate generally to secure content and, more particularly, to methods and systems for providing secure offline file access utilizing information rights management.

Description of the Related Art

Secure offline file access is a significant business problem. In the past, providing offline access to files increased the risk of data loss or theft of intellectual property that could prove disastrous to a company. However, providing convenient offline accessing of protected or secure files is also very important, as individuals accessing files are not always connected to a network that allows them to do further work on the files while offline. Existing solutions are very limited, such as only allowing for a date-based file access, where the date is set on the file or on a server. Existing solutions also do not provide for encrypted key stores, such as protected by a personal password, identification number, and the like.

Information rights management (IRM), which is a subset of digital rights management (DRM), may be used by businesses to protect sensitive information from unauthorized access, viewing, editing, distribution, and the like. For instance, IRM technologies may be used to create a protected document that can only be accessed based on fixed IRM encoding that travels with the document and is based on the IRM encoding that was attached to the document at the time of the document's creation. However, a fixed IRM scheme does not allow the creator of the document to alter the IRM settings. In another instance IRM technologies may be used to create a protected document based on IRM protections that are dynamically controlled, such as through connectivity across the Internet (e.g., between the computer that stores the document and an IRM facility located on a networked server). However, in this instance once a user disconnects the computer from the network the user may lose access rights to the document.

Accordingly, there exists a need in the art for methods and systems for providing secure offline file access utilizing information rights management.

SUMMARY OF THE INVENTION

Systems and methods for providing secure offline file access utilizing information rights management (IRM) are provided herein. In some embodiments, the method for providing secure offline file access utilizing IRM may comprise storing one or more IRM-protected documents in a secure local storage on a user device; storing one or more consumption licenses associated with the one or more IRM-protected documents in the secure local storage on the user device, wherein the one or more consumption licenses is required to access one or more IRM-protected documents; detecting a loss of network connectivity on the user device; writing the one or more consumption licenses to an IRM location in memory on the user device; receiving a request to open a document of the one or more IRM-protected documents; reading the consumption license from the IRM location in memory; and enabling access to the requested IRM-protected document based on the consumption license.

In some embodiments, the system for providing secure offline file access utilizing IRM may comprise an information rights management (IRM) server comprising a database of IRM-protected documents and a document access manager for generating consumption license for offline file access, and a user device for performing the method for providing secure offline file access utilizing IRM.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments consistent with the present invention are directed to methods and systems for providing secure offline file access utilizing information rights management (IRM). An IRM server may provide access management for protected documents stored on a user device when the user device transitions between network connectivity and being offline from the network. IRM-protected documents are stored in a secure database that is managed by an IRM server. The IRM-protected documents are transferred to a user device for viewing or modifying. Upon transfer, the IRM-protected documents are stored in a secure local storage on the user device. When a user device has network connectivity and a user authenticates him or herself on the user device, the IRM-protected documents in the secure local storage are scanned, and the user licenses embedded within the IRM-protected documents are read. The user licenses are sent to the IRM server where consumption licenses are generated and sent back to the user device. Consumption licenses identify the conditions under which a user may access the IRM-protected document. For example, the consumption license may define whether a user may modify the document or merely view the document. The consumption license may define a "lease time", identifying for how long or for what period of time the user may access the document. The consumption license may specify what actions are allowed by the user when the user device is connected to the IRM server versus what actions are allowed by the user when the user device loses connectivity to the IRM server. Consumption licenses are used by a consumption application with which the user is accessing the document (e.g., MICROSOFT WORD, EXCEL, or other word processing and editing software). The consumption licenses are stored in secure local storage with the encrypted IRM-protected documents.

When a user device loses connectivity to the IRM server, the consumption licenses that are stored in the secure local memory of the user device are written to a special IRM location on the user device. When a user attempts to open a document while offline, the consumption application that is being used to access the document retrieves the consumption license from the IRM location on the user device instead of requesting the consumption license from the IRM server. However, when connectivity to the user device is regained, the consumption licenses are removed from the IRM location on the user device. The next time the user attempts to open the document, the consumption application requests a consumption license from the IRM server. When the consumption license is received, the consumption application decrypts and displays the document, enabling access to the document based on the consumption application. As such, even when a user device is offline, a user may access protected documents.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Figure 1:
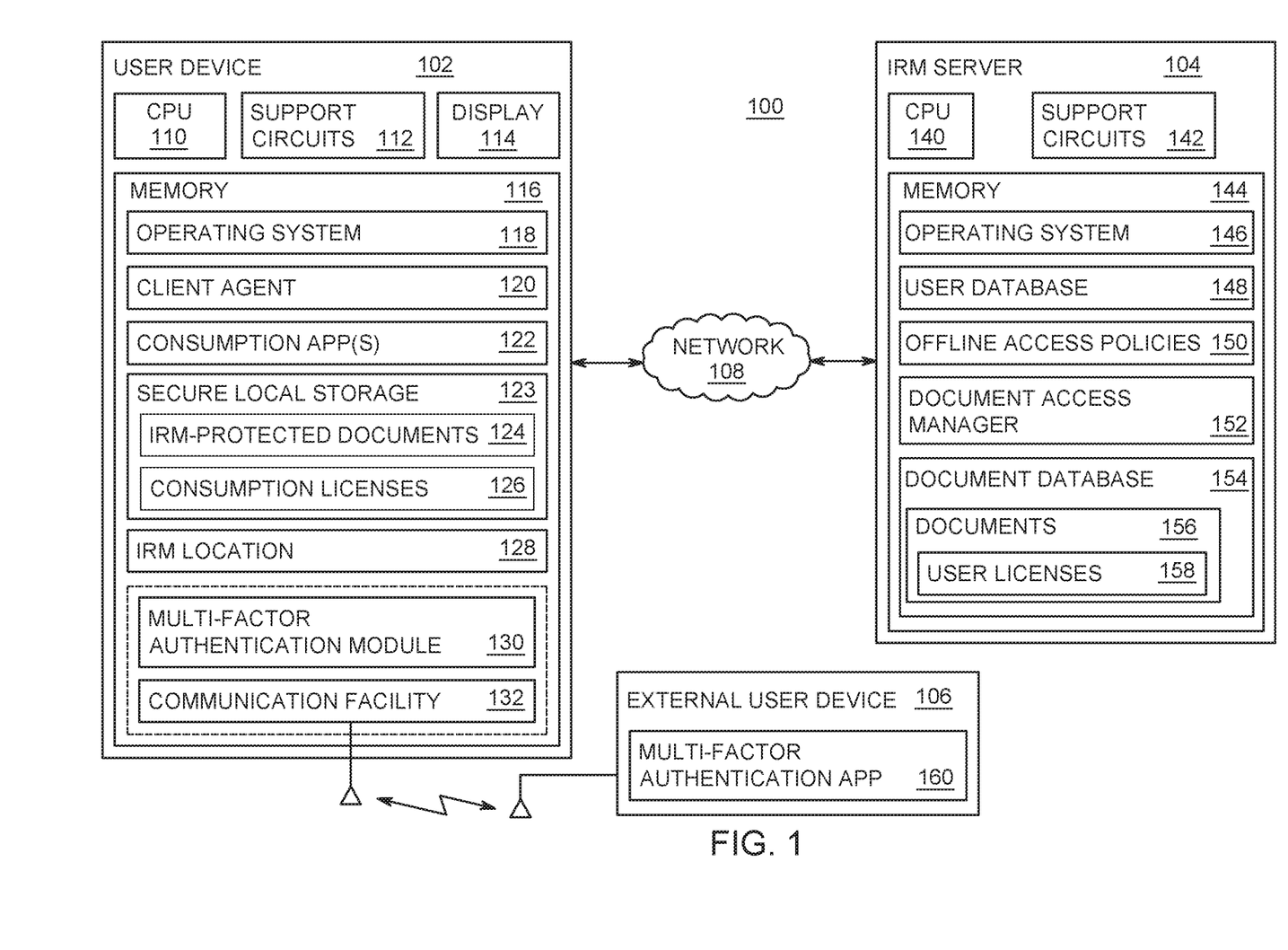
FIG. 1 is a block diagram of a system for providing secure offline file access utilizing information rights management in accordance with one or more embodiments of the invention.

FIG. 1 is a block diagram of a system 100 for providing secure offline file access utilizing information rights management in accordance with one or more embodiments of the invention. The system 100 includes a user device 102, an IRM server 104, and an external user device 106. The user device 102 and IRM server 104 may be communicatively coupled to each other via network 108.

Figure 5:
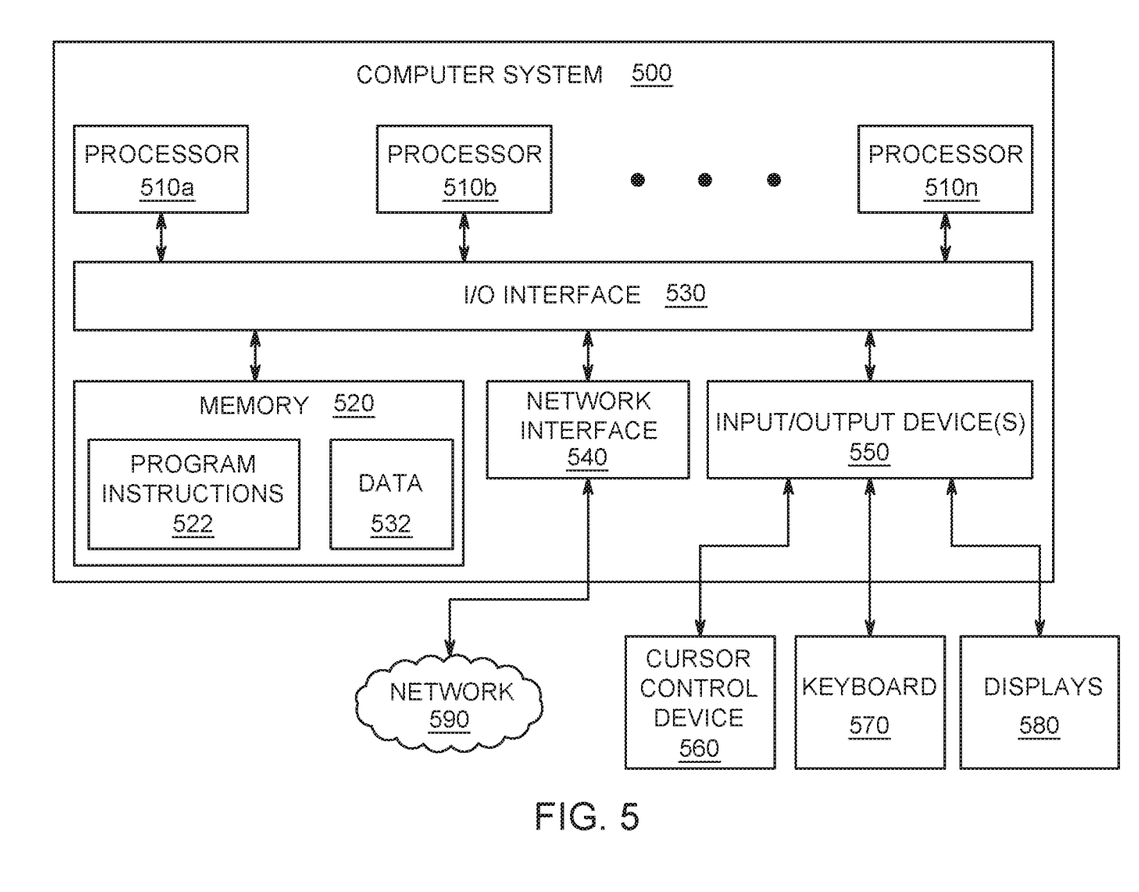
FIG. 5 is a depiction of a computer system that can be utilized in various embodiments of the present invention.

The user device 102 may be a type of computing device for example, a mobile device, a desktop computer, laptop, tablet computer, and the like. One example of a suitable computer is shown in FIG. 5, which will be described in detail below.

User device 102 includes a Central Processing Unit (CPU) 110, support circuits 112, a display 114, and a memory 116. The CPU 110 may include one or more commercially available microprocessors or microcontrollers that facilitate data processing and storage. The various support circuits 112 facilitate the operation of the CPU 110 and include one or more clock circuits, power supplies, cache, input/output circuits, and the like. The memory 116 includes at least one of Read Only Memory (ROM), Random Access Memory (RAM), disk drive storage, optical storage, removable storage and/or the like.

The memory 116 includes an operating system 118, a client agent 120, one or more consumption applications 122, such as the MICROSOFT® Office suite of applications or any application used to access and/or modify documents, a secure local storage 123 that includes one or more IRM-protected documents 124 along with one or more consumption licenses 126. Memory 116 further includes an IRM location 128, such as a MICROSOFT® Information Protection and Control Client (MSIPC) folder or similar facility. In some embodiments, the user device 102 includes a multi-factor authentication module 130, and a communication facility 132, for example a BLUETOOTH® facility for communicating with external user device 106 for use in multi-factor authentication.

External user device 106 may be a computing device, such as a mobile device, tablet, or any device adapted to communicate with, for example a BLUETOOTH® transmitter or any near-field transmitter. In some embodiments, the external user device 106, may be a card, badge, dongle, or the like, that is used in various embodiments as part of the architecture for multi-factor authentication. The external user device 106 may have multi-factor authentication application 160 adapted to communicate with a BLUETOOTH® transmitter (e.g., the LIGHTBLUE BEAN® or other like transmitting device) that is integrated into the external user device 106 that a user is able to carry with them (e.g., a BLUETOOTH® enabled employee badge clipped onto the user's clothes, a card that can be stored in a pocket/wallet/purse, a tag that can be attached to clothing, or the like). Although BLUETOOTH® is utilized in this example, it is not meant to be limiting any way, where one skilled in the art would appreciate that any like transmitting technology would satisfy the communications requirements between the user device 102 and the transmitter on the external user device 106. In this example, the transmitter may have a unique identifier (UDID) that is assigned to a user's account, so even with access to the user device 102, IRM-protected documents 124 will only be accessible if the user device 102 and BLUETOOTH® transmitter are within range of one another. This system functions as two-layer authentication, first through the access to the application and second through having the BLUETOOTH® transmitter within range of the user device 102 as will be described in greater detail below.

The IRM server 104 is a computing device, for example, a desktop computer, laptop, tablet computer, and the like, or it may be a cloud based server (e.g., a blade server, virtual machine, and the like). One example of a suitable computer is shown in FIG. 5, which will be described in detail below. According to some embodiments, the IRM server 104 includes a Central Processing Unit (CPU) 140, support circuits 142 and a memory 144. The memory 144 includes an operating system 146, a user database 148, a plurality of offline access policies 150, a document access manager 152, and secure document database 154. The document database 154 includes a plurality of protected documents 156, wherein each document 156 includes one or more user licenses 158. Although the document database 154 is shown as part of the IRM server 104, in some embodiments, the document database 154 is remote from the IRM server 104.

The CPU 140 may include one or more commercially available microprocessors or microcontrollers that facilitate data processing and storage. The various support circuits 142 facilitate the operation of the CPU 140 and include one or more clock circuits, power supplies, cache, input/output circuits, and the like. The memory 144 includes at least one of Read Only Memory (ROM), Random Access Memory (RAM), disk drive storage, optical storage, removable storage and/or the like.

The user device 102 and the IRM server 104 may be connected via a network 108, such as a Wide Area Network (WAN) or Metropolitan Area Network (MAN), which includes a communication system that connects computers (or devices) by wire, cable, fiber optic and/or wireless link facilitated by various types of well-known network elements, such as hubs, switches, routers, and the like. The network interconnecting some components may also be part of a Local Area Network (LAN) using various communications infrastructure, such as Ethernet, Wi-Fi, a personal area network (PAN), a wireless PAN, Bluetooth, Near field communication, and the like.

A user may request IRM-protected documents 156 from the IRM server 104. The IRM-protected documents 156 are transferred to the user device 102 and stored in a secure local storage 123. In some embodiments, an IRM offline access policy 150 may be established to enable a lease time to be configured that allows up to a given period (e.g., 24 hours, one week) of access to a user or a group of users while the user(s) is offline (hereinafter referred to in some cases as "Lease Time"). For example, a user may be traveling on an airplane or residing in an environment that does not provide WiFi, cable or other means of Internet access, and the user may wish to access or otherwise work on IRM-protected documents in the absence of network access. A consumption license 126 defines the terms of the access. Once the Lease Time expires, a user may not be able to access the IRM-protected documents 124 until the user is back online.

In some embodiments, an administrator for an enterprise (an "Administrator") may configure an offline access policy 150 that allows IRM offline access. In some embodiments, an end user may enable offline access on a device-specific basis, so that a document 156 can be worked on offline only on a specific user device 102 that is authorized by the user under the administered offline access policy 150; that is, for every device on which the user needs offline access, the user may be required to enable a setting to use IRM offline. In some embodiments, offline access may be made available to particular sets of documents 156, such as documents that have been given levels of protection, such as protection at the level of a workspace. In some embodiments, offline access may be made available at the folder level, such as for folders in a workspace that have folder-level protection.

In some embodiments, enabling IRM offline access may be required each time a user wishes to have offline access, rather than being a setting that is configured one time for a document, folder, workspace, or the like. In some embodiments, the configuration of a setting to enable the offline access may be specified for a particular period of time (for example, such as a future time during which the user expects to be in flight), or may be configured to expire after a given time period, after which settings automatically default to ones in which offline access is not permitted for the IRM-protected document 156. In some embodiments, a user may be required to anticipate being offline and to undertake action to access IRM protected documents 156 offline each time a user wishes to have offline access.

IRM systems typically track users by identity, such as by a user name that is associated with a real name of an individual. However, in some cases it may be desirable to allow parties to access information anonymously, while still providing some amount of control over access and reporting. Thus, in such embodiments, the methods and systems provided herein may enable an anonymous information rights management (IRM) user to obtain access to a resource (which may be limited access, such as read only access, or access only from a known location), but as long as the user satisfies any other required conditions on the access (such as being a user from a given company, a given domain, a given jurisdiction, or the like), the user does not have to provide further identification, such as a username and password, in order to access an IRM protected document 156. Anonymous access may also be configured to permit offline access on an anonymous basis for up to a specified Lease Time or using other means of permitting offline access to IRM protected documents. To enable anonymous access, permissions may be set to allow access content, without entry of a user name, password, or other individually identifying information. Information about the identity of the user may be not collected, or it may be collected anonymously, but the system may still be able to identify and condition access upon other information, such as where the document has been, from what domain it was accessed, from what location it was accessed, where it was shared, when it was accessed, or the like. Information about access may be tracked on an aggregated basis, such as reporting activities for a group of users, without identifying specific users; for example, a report may be provided that, for example, twenty-five users from a company accessed documents relating to a sales deal, without indicating exactly which users did so. Similarly, a company may allow customers to have anonymous access to documents relating to a product or service, while maintaining the privacy of the customers. In some embodiments, certain parties may be allowed to access the content anonymously, while others can see only metadata that reports on the general nature of access, without providing any information about individuals. Anonymous IRM may be of value in the context of a transaction, such as where each party may be willing to have the other party be aware of general levels of activity relating to content (e.g., that the content has been reviewed), but not about exactly which people have accessed the content.

In some embodiments, an Administrator may create and assign group offline access policies 150 to a group of users (referred to in some cases herein as a "Business Group"). In some embodiments, an Administrator may enable and disable a policy 150 on a Business Group that allows IRM offline access. In embodiments, once an Administrator administers a policy change on a Business Group, all data and workspaces belonging to the Business Group are impacted by the policy changes. In some embodiments, if a user has online access, offline licenses that enabled offline access for the workspace may be removed for all the users in the Business Group. In embodiments, if a user does not have online access, the user will continue to be able to access the user's local copy of the IRM protected document until the Lease Time expires.

In some embodiments, IRM protected documents 124 that are edited by a user while offline may be uploaded and synchronized once the edited IRM-protected documents 124 are closed and the user is online, so that edits made to the IRM protected documents 124 can be made to the IRM protected documents 124 stored in the document database 154. In some embodiments, if, during the upload of an offline edited IRM protected document 124, a server has detected a newer version of the IRM protected document 124, a conflict document may be generated on the user device 102. In such embodiments, the user must resolve the conflict by merging changes in the edited IRM-protected document version into the synced version of the document 156. In certain instances, IRM protection may be disabled on a document 156 while a user with IRM offline access is editing the IRM-protected document 124 offline. In some embodiments, an IRM-protected document 124 that is edited by a user offline may be saved to a conflict document while the server version of the document is synced to the user's desktop. In such embodiments, the synced document may not have IRM protection, since the IRM protection was disabled on the workspace, and the end-user in such cases must resolve the conflict by merging the changes into the synced version of the document.

In certain instances, a network may be disconnected before documents are ready for offline access. For example, a user may have a large number of documents on a workspace selected for offline access and may, immediately after selecting the documents, go offline. In embodiments, if an IRM protected document has not completed syncing and is not available for a user to access while offline, the user may be notified.

In certain instances, a user may pause a synchronization of an IRM-protected document when a user goes online or offline (referred to in some cases herein as a "User Pause"). In such embodiments, the consumption license 126 for access to an IRM protected document 124 during a User Pause may stop renewing. In some embodiments, the consumption license 126 may periodically renew to ensure the user's permissions on the IRM-protected documents 124 are up to date. In embodiments, where a license is not renewed during a User Pause, the IRM offline Lease Time may expire and the user may not have access to the IRM-protected document 124. In such embodiments, once a user resumes synchronization after a User Pause, the license renewal may be restarted or occur periodically.

As a consequence of offline accessibility, a user may be able to view and edit IRM-protected documents 124 while the user is not connected to the network 108, and thus a user's access may not be revoked by the IRM server 104 via the network 108 while the user device 102 is offline. For example, if the permission for a user to have access is revoked, if the role of the user is changed, or the document, folder, or workspace is deleted from the document database 154 while the user device 102 is offline, the IRM server 104 may wait for the user to become connected to the network 108, at which point the consumption licenses 126 are updated and, if appropriate, removed at that point. In some embodiments, the removal of permission may be performed manually rather than being updated automatically upon becoming connected to the network 108. Thus, for the duration of the Lease Time, a user may have access to the IRM-protected document 124 even if the user's permissions are revoked at the IRM server 104.

In practice, the document access manager 152 determines based on information for a user in the user database 148 what offline access policy 150 applies to the user. Upon receipt of a user license from a consumption application 122, the document access manager 152 generates an appropriate consumption license and sends it to the consumption application 122 which is stored as consumption license 126. The client agent 120 monitors the connectivity of the user device 102 to the IRM server 104. If connectivity is lost, the client agent 120 writes the consumption licenses 126 on the user device 102 to an IRM location 128 in, for example the WINDOWS registry of the user device 102. As such, after connectivity is lost, when a user attempts to open an IRM-protected document 124, the consumption application 122 reads the consumption license 126 from the IRM location 128, since the consumption application 122 cannot request a current license from the IRM server 104 due to the loss of connectivity.

When the client agent 120 determines that the user device 102 has regained connectivity to the IRM server 104, the client agent 120 deletes the consumption licenses from the IRM location 128. When a user attempts to access an IRM-protected document 124, the consumption application 122 will once again request and receive a consumption license 126 from the IRM server 104 before decrypting the IRM-protected document 124 for the user and displaying the document on display 114.

In some embodiments, a mobile device security level assessment may be provided to assess a user device 102 for a level of security based on hardware features of the user device 102, and dynamically enable features based on the hardware profile of the mobile device. For example, if the user device 102 is an PHONE®, the IRM server 104 may allow an offline access to an IRM-protected document 156, while on an ANDROID Device® the offline access function is prevented, where some hardware feature or software feature difference between the two types of mobile devices determines different security levels associated with a particular system functionality (e.g., because of sandboxing, which isolates your application data and running programs from other applications and may limit an application's access to files, the offline access function is safe). A security level assessment may be based on a real-time assessment of the user device 102 or based on information stored in a central security database (not shown), such as where the database is updated based on the assessed security rating of the device. In this way the IRM server 104 is able to remove access to some features for a specific mobile device or mobile device type, such as allowing or denying offline access or copy/paste functionality for a document available through the system or limiting the duration of permitted Lease Time if offline access is allowed, such as based on the security assessment level stored in the central security database. In such embodiments, mobile device characteristics that may influence the security level assessment may be type or model, operating system, communications facilities, resident applications, email accounts, configuration settings, application settings, communication settings, and the like.

In some embodiments, offline access may include mobile security multifactor authentication, using multi-factor authentication module 130, for a user device 102, such as through augmenting a conventional user ID and password with use of a BLUETOOTH connection (e.g., BLUETOOTH low energy (BTLE), such as used in iBeacons® or other BTLE implementations), limited local access keys (such as used for offline access of documents, as disclosed elsewhere herein), an indicator of proximity, and the like. One of the problems that multifactor authentication addresses is that when enabling an offline mode of document access on a user device 102, server control is lost, and any capability to remotely leverage client-server cryptography communication is lost. In a non-multifactor authentication model of offline access, an encryption key may be required to decrypt documents that are stored on the user device 102 and that are encrypted at rest. In this instance, an encrypted IRM-protected document 124 and the corresponding encryption key may be downloaded and stored on the user device 102 while Internet access is available, where the encryption key is used to access the corresponding encrypted IRM-protected document 124 when the user device 102 is offline. However, despite measures to protect the encryption key, there is a significant risk of an unauthorized access from a determined attacker, who may obtain access to the key through use of brute force decryption measures and access the IRM-protected document 124.

Since the basis of this security weakness is rooted in storing both the encryption key and the encrypted IRM-protected document 124 on the same device, essentially presenting an attacker with both the lock (e.g., the encrypted content) and the key (e.g., the encryption key) on the same device, one solution is a multifactor authentication method. With multifactor authentication, an attacker would have to gain possession of both the victim's user device 102 and additional factors of authentication that are not stored locally on the user device 102, an arrangement that reduces the risk of intentional or unintentional security lapses. For an improved user experience and maximized compatibility with a wide range of devices, the connection to a second factor of authentication may be set up utilizing an RF connection technology that is already available on a typical smart mobile device, such as BLUETOOTH Low Energy (e.g., BLUETOOTH Smart) with proximity capabilities.

A multi-factor authentication module 130 may be provided for secure access to an IRM-protected document 124 stored in the secure local storage 123 on a user device 102 based on a combination of factors such as RF connectivity from a communication facility 132 in the user device 102 to an external user device 106, proximity to the external user device 106, user ID, use of a local stored encryption key, a local stored user identifier (e.g., password, PIN), and the like. In the instance where RF connectivity and proximity detection are utilized, the multi-factor authentication module 130 (e.g., a multifactor authentication application on a smart cellular phone, also referred herein as 'application') may monitor RF connectivity between a communication facility 132 in the user device 102 and the external user device 106 (also referred herein as 'transmitter'). In an example, the communication facility 132 may be a BLUETOOTH facility on a smart phone communicating with the external user device 106 that is an external BLUETOOTH transmitter. For instance, a BTLE implementation of BLUETOOTH may utilize both BLUETOOTH detection and proximity of the device to the transmitter connection point as factors in multifactor authentication. This combination of authentication factors enables offline access to an IRM-protected document 124, where the user device 102 may be enabled to continuously look for BLUETOOTH signals. In another example, the multi-factor authentication module 130 may monitor for BLUETOOTH signals (e.g., where the range is set in the mobile device) where proximity satisfies one of the authentication multi-factors. In combination, another authentication factor may be used, such as utilization of a user ID. In this way an encrypted, IRM-protected document 124 may only be accessed when a predefined set of multi-factor authentication conditions have been satisfied, such as the user having a key previously downloaded to their user device 102, having the correct user ID, having connectivity with a transmitter, being in predetermined proximity to a transmitter, and the like.

In some embodiments, the operations between the multi-factor authentication module 130 and the BLUETOOTH transmitter integrated with the external user device 106 may include a universally unique identifier (UUID), such as in an application where the user identifier is associated with an employee number and a user's company badge, and the user device 102 is the user's mobile smart phone. The BLUETOOTH transmitter may be initially configured in a beacon mode (e.g., iBeacon), where it emits the UUID. The UUID may be configured with a format that may be utilized by the application, such as with a "major" portion (integer between 0~65,535) and a "minor" portion (integer between 0~65,535), where the major portion may be set to a client identifier, such as representing a specific company, and the minor portion may be set to a unique employee ID, such as saved in a user's profile. In addition, after first pairing between the user device 102 and the transmitter on the external user device 106, the badge's pairing password may be set to a user PIN (e.g., 6-digit PIN). The predetermined proximity range may be set in the application, such as selected from 'immediate' (e.g., from touching to approximately 4 inches), 'near' (e.g., between 4 in and 7 ft), 'far' (between 7 ft and 20 ft), and the like. The user device 102 may scan only for the badge with the appropriate UUID using beacon functionality. This type of limited scanning may conserve battery power and eliminate confusion between different badges. When the correct badge is found within the predetermined proximity range, the user device 102 may attempt to connect to the transmitter (e.g., via CoreBluetooth) and trigger a BLUETOOTH Pairing dialog, such as requiring the previously set PIN to securely pair. Once paired, only the current device may be able to auto-connect to the badge. Once connected, if the user device 102 is offline it may download encryption keys from the badge into the memory of the user device 102. Then the badge closes the connection and proximity is monitored, such as through beacon functionality. Once the badge-transmitter moves out of range, the application may release all encryption keys from RAM such as to disable access to offline IRM-protected documents 124. Then proximity to the badge-transmitter is monitored. When the badge-transmitter is in range again, the process is repeated.

The multi-factor authentication app 160 on the external user device 106 may be adapted to transmit a unique transmitter identifier that matches a stored unique transmitter identifier in the memory 116 of the user device 102, wherein the multi-factor authentication module 130 monitors for connectivity between the communication facility 132 and the external user device 106, and monitors for the transmission of the unique transmitter identifier. If a communication connection is detected between the mobile device communication facility 132 and the external user device 106, and the transmitted unique transmitter identifier matches the stored unique transmitter identifier in the memory 116 of the user device 102, then an IRM-protected document 124 will be enabled for access if at least one additional authentication factor is provided, the at least one additional authentication factor selected from the group including: (i) a user identifier entered into the user device 102, (ii) a user password entered into the mobile computing device, (iii) use of a digital key stored in the memory of the user device 102, which is associated with access permission to the IRM-protected document 124, and (iv) a determination that the distance between the mobile device communication facility 132 and the external user device 106 is within a predetermined range value.

In some embodiments, multifactor authentication may utilize physiological or behavioral characteristics as personal authentication factors in the authorization to access content through a mobile device. Physiological or biometric authentication factors may be utilized as authentication factors, such as utilizing a fingerprint, palm print, face recognition, DNA, iris recognition, vital signs, skin conductance characteristics, heart rate characteristics, and the like, that can be used in combination with another authentication factor to provide access to IRM-protected documents 124. Physiological characteristics may be determined through a separate wearable device (e.g., a bio-tracking wearable device) communicatively connected with the user device 102 or entered through the user device 102 itself. For example, a user may request access to an IRM-protected document 124 while the user is offline by providing a thumbprint to the touchscreen of their user device 102 and through a fingerprint recognition application, and as long as the user is also in range of a BLUETOOTH transmitter with a UIID registered with the user device 102, is provided access to the IRM-protected document 124. Behavioral characteristics may also be utilized in multi-factor authentication, such as in providing input to a user behavioral characteristics profile, including contributing factors such as mobile phone typing rhythm, waking gait, voice pattern recognition, and the like. A behavioral characteristics profile may utilize a plurality of personal behavioral contributing factors to build an authentication factor to be used by the multifactor authentication facility in combination with another authentication factor to provide a user with access to content. For example, a behavioral characteristics profile may include four behavioral characteristics that are monitored, and if any three of them are satisfied during a predetermined period of time, the profile may be used as an authentication factor, for instance in combination with BLUETOOTH proximity as described herein. Similarly, a physiological characteristic profile, or a profile combining physiological and behavioral characteristics, may be used in multifactor authentication, such as monitoring a combination of physiological and/or behavioral characteristic sub-factors that contribute to an authentication factor that is used in combination with another authentication factor to provide access to content. For example, a user may be wearing a bio-tracking or activity-tracking device connected to a user's mobile device that senses heart rate and skin conductivity that in combination with tracked mobile device usage characteristics (e.g., typing, movement patterns) creates a monitored condition that if it matches a stored profile may be used as an authentication factor in multifactor authentication.

Figure 2:
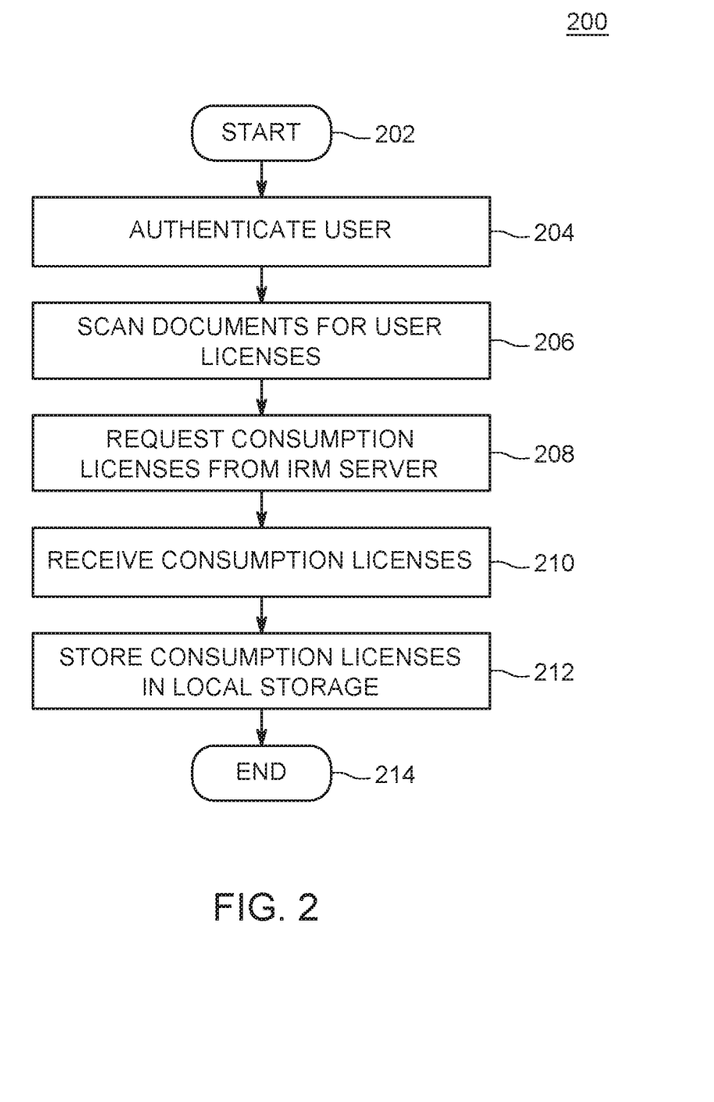
FIG. 2 is a flow diagram of a method for preparing a user device for offline file access, in accordance with one or more embodiments of the invention.

FIG. 2 is a flow diagram of a method 200 for preparing a user device for offline file access, in accordance with one or more embodiments of the invention. The method 200 is performed on a user device by a user who is authorized to access IRM-protected documents. The method 200 starts at step 202 and proceeds to step 204.

At step 204, a user is authenticated. In some embodiments, a user logs into the user device, with for example, a user identifier and password or any method for verifying the identity of a user known in the art.

At step 206, IRM-protected documents on the user device are scanned. IRM-protected documents have user licenses embedded within them. The user licenses are read from the documents and are then packed together in a single, encrypted, compressed data unit.

At step 208, a request is sent to the IRM server for consumption licenses for the IRM-protected documents. The encrypted compressed user licenses are sent in the request.

At step 210, consumption licenses are received. A consumption license is received for each file the user is authorized to access at the given time. A consumption license may be, for example, an extensible rights markup language (XrML) license. The consumption licenses may contain an absolute time of expiration. In some embodiments, the consumption licenses may be digitally signed with a private key available only on the IRM server. Therefore, only the IRM server is able to issue the consumptions licenses. Due to the fact that consumption licenses are digitally signed, changes cannot be made to an existing expired consumption license. In some embodiments, the consumption licenses are received as a single, encrypted, compressed data unit.

At step 212, the consumption licenses are stored in a local storage on the user device. If a consumption license for an IRM-protected document already exists in the local storage, the existing consumption license is updated.

The method 200 ends at step 214.

Figure 3:
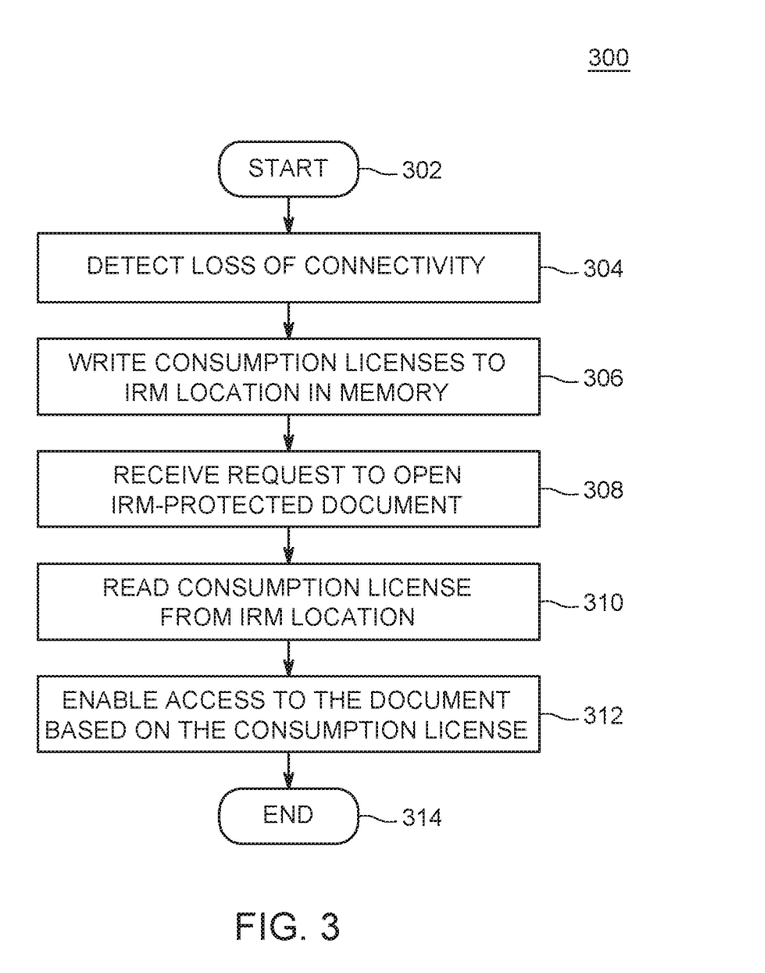
FIG. 3 is a flow diagram of a method for enforcing information rights management when a user device loses connectivity to a digital rights management server, in accordance with one or more embodiments of the invention.

FIG. 3 is a flow diagram of a method 300 for enforcing information rights management when a user device loses connectivity to a digital rights management server, in accordance with one or more embodiments of the invention. The method 300 starts at step 302 and proceeds to step 304.

At step 304, a loss of connectivity is detected. In other words, the user goes offline. A client agent on the user device continually monitors the network connection, such that when the offline condition occurs, it is immediately detected.

At step 306, the consumption licenses are read from the secure local storage area and written to the IRM location in memory. The IRM location may comprise a MICROSOFT® office MSIPC folder or similar facility.

At step 308, a request is received to open an IRM-protected document. A consumption application is an application that is used to open the document, for example one of the applications of the MICROSOFT suite of applications (e.g., MICROSOFT WORD, MICROSOFT POWERPOINT, MICROSOFT EXCEL, MICROSOFT ACCESS, and the like). The consumption application requires the consumption license in order to provide access to the IRM-protected document.

At step 310, the consumption license is read from the IRM location. The consumption application always looks for the consumption license in the IRM location, for example the MSIPC folder. Due to the fact that the user is offline, and the consumption license is found in the IRM location, the consumption application need not request the consumption license from the IRM server.

If, based on the consumption license, the user is still authorized to access the IRM-protected document, then at step 312, the consumption application enables access to the document based on the consumption license. While the user device is offline, a security audit of offline events may be captured on the device. For example, the consumption license may allow for the user to access the document a specific number of times. In another example, the consumption license may allow for the user to access the document until a specified time. In yet another example, a user may be allowed to access the document when the user device is offline, but may not allow a user to edit the document when the user device is offline. The security audit tracks what documents are accessed, how many times, which documents were modified, and the like. The provisions of the consumption license are reviewed and enforced even when the user device is offline. If a license for a user is revoked while the user is offline, the revocation for that user for one or more documents does not take effect until connectivity to the IRM server is regained. The method 300 ends at step 314.

Figure 4:
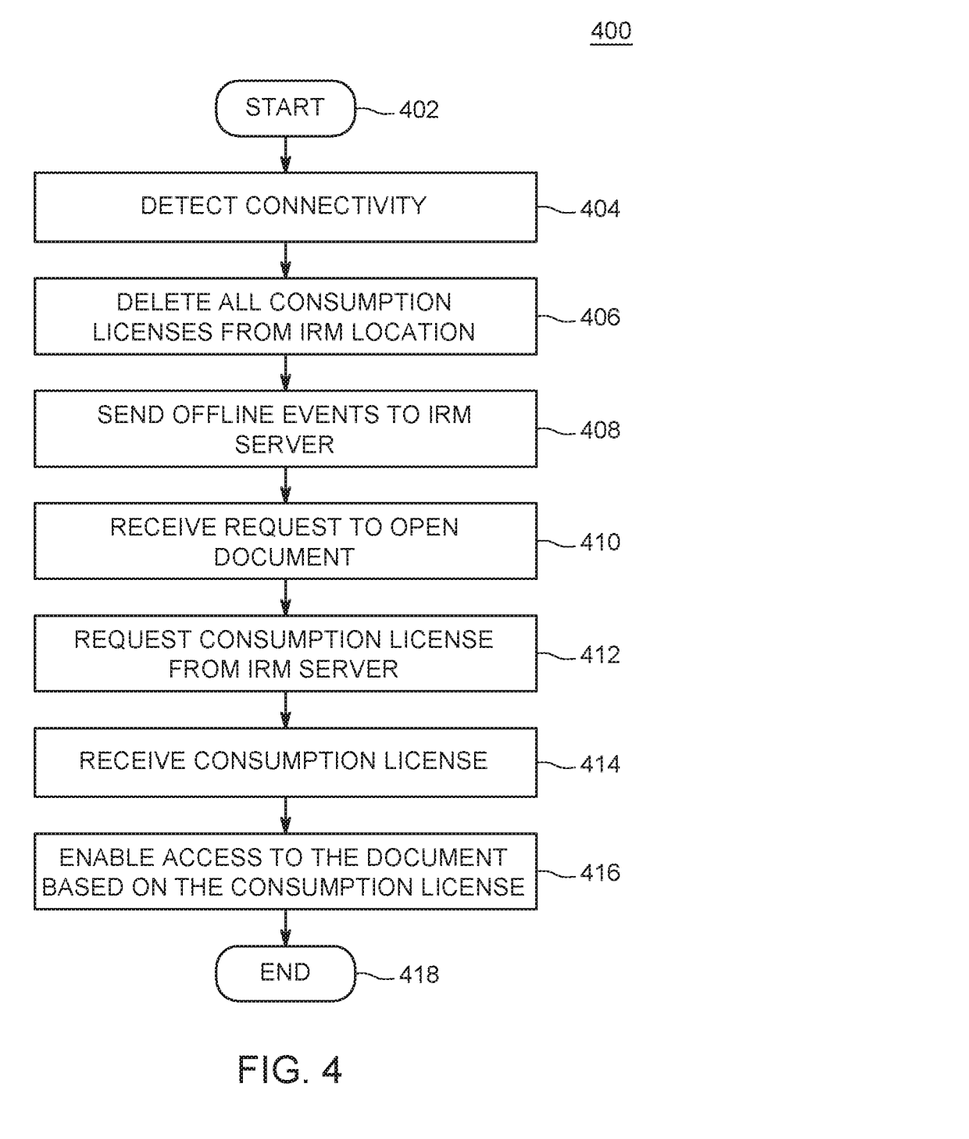
FIG. 4 is a flow diagram of method for enforcing information rights management when a user device regains connectivity to a digital rights management server in accordance with one or more embodiments of the invention.

FIG. 4 is a flow diagram of method 400 for enforcing information rights management when a user device regains connectivity to a digital rights management server in accordance with one or more embodiments of the invention. The method 400 starts at step 402 and proceeds to step 404.

At step 404, connectivity to the IRM server is detected. In other words, the user device is back online. The client agent that continually monitors the network connection determines network connectivity has been regained.

At step 406, all of the consumption licenses in the IRM location are deleted from the IRM location. Without the consumption licenses in the IRM location, a consumption application needs to request the consumption licenses from the IRM server.

At step 408, offline events are sent to the IRM server. The offline events gathered during the security audit are sent to the IRM server. The IRM server may process the security audit in order to determine whether any user's rights to access those documents were revoked during the time the user was offline. In such case, the IRM may generate security alerts or trigger other remedial actions.

At step 410, a request is received to open a document. The consumption application used to open the document looks for a consumption license for the document in the IRM location in memory (e.g., MSIPC folder). When no consumption license is found, at step 412, the consumption license for the document is requested from the IRM server. The IRM server authenticates and authorizes the user and generates a new consumption license.

At step 414, the consumption application receives the consumption license from the IRM server and at step 416 the consumption application enables access to the document based on the received consumption license. The method 400 ends at step 418.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk, C #, or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

FIG. 5 depicts a computer system 500 that can be utilized in various embodiments of the present invention to implement the computer and/or the display, according to one or more embodiments.

Various embodiments of method and apparatus for providing secure offline file access utilizing information rights management, as described herein, may be executed on one or more computer systems, which may interact with various other devices. One such computer system is computer system 500 illustrated by FIG. 5, which may in various embodiments implement any of the elements or functionality illustrated in FIGS. 1-6. In various embodiments, computer system 500 may be configured to implement methods described above. The computer system 500 may be used to implement any other system, device, element, functionality or method of the above-described embodiments. In the illustrated embodiments, computer system 500 may be configured to implement the methods 300 and 400 as processor-executable executable program instructions 522 (e.g., program instructions executable by processor(s) 510) in various embodiments.

In the illustrated embodiment, computer system 500 includes one or more processors 510a-510n coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In various embodiments, any of the components may be utilized by the system to receive user input described above. In various embodiments, a user interface may be generated and displayed on display 580. In some cases, it is contemplated that embodiments may be implemented using a single instance of computer system 500, while in other embodiments multiple such systems, or multiple nodes making up computer system 500, may be configured to host different portions or instances of various embodiments. For example, in one embodiment some elements may be implemented via one or more nodes of computer system 500 that are distinct from those nodes implementing other elements. In another example, multiple nodes may implement computer system 500 in a distributed manner.

In different embodiments, computer system 500 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs). In multiprocessor systems, each of processors 510 may commonly, but not necessarily, implement the same ISA.

System memory 520 may be configured to store program instructions 522 and/or data 532 accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 520. In other embodiments, program instructions and/or data may be received, sent or stored upon different types of computer-accessible media or on similar media separate from system memory 520 or computer system 500.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network (e.g., network 590), such as one or more external systems or between nodes of computer system 500. In various embodiments, network 590 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 540.

In some embodiments, the illustrated computer system may implement any of the operations and methods described above, such as the methods illustrated by the flowchart of FIGS. 2-4. In other embodiments, different elements and data may be included.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer-implemented method for providing secure offline file access utilizing information rights management (IRM), comprising:
   storing one or more IRM-protected documents in a secure local storage on a user device;
   storing one or more consumption licenses associated with the one or more IRM-protected documents in the secure local storage on the user device, wherein the one or more consumption licenses is required to access one or more IRM-protected documents;
   detecting a loss of network connectivity on the user device;
   in response to detecting the loss of network connectivity, writing the one or more consumption licenses to an IRM location in memory on the user device;
   receiving a request to open a document of the one or more IRM-protected documents during the loss of network connectivity;
   reading the consumption license from the IRM location in memory; and
   enabling access to the requested IRM-protected document based on the consumption license.

2. The method of claim 1, further comprising:
   authenticating a user on a user device when the user device has network connectivity;
   scanning one or more IRM-protected documents on the user device for embedded user licenses;
   transmitting the one or more user licenses to an IRM server, wherein the one or more user licenses are encrypted and compressed into a single data unit;
   receiving one or more consumption licenses from the IRM server, wherein each of the one or more consumption licenses corresponds to one document of the one or more IRM-protected documents; and
   storing the one or more received consumption licenses in a local storage on the user device.

3. The method of claim 1, further comprising:
   detecting that network connectivity has been regained on the user device;
   deleting the one or more consumption licenses from an IRM location in memory on the user device;
   receiving a request to open a document of the one or more IRM-protected documents;
   transmitting a request for a consumption license to an IRM server;
   receiving an updated consumption license from the IRM server; and
   enabling access to the requested IRM-protected document based on the updated consumption license.

4. The method of claim 1, wherein the consumption license is based on an offline access policy for one of a user, a group, or an anonymous user.

5. The method of claim 1, wherein the consumption license provides a lease time for offline access.

6. The method of claim 1, wherein the consumption license applies to one of a plurality of files or folders.

7. The method of claim 1, wherein the consumption licenses is applied to at least one of a specific user or specific computing device.

8. The method of claim 1, wherein the consumption license provides a set expiration time for access to the IRM-protected document.

9. The method of claim 1, wherein the consumption license limits actions when the user device is online and offline.

10. The method of claim 1, wherein the consumption license is associated with offline access through multifactor authentication, wherein the consumption license identifies additional user verification requirements utilizing a device that is external to the user device.

11. The method of claim 1, wherein the consumption license is associated with offline multifactor authentication, wherein the consumption license identifies additional user verification requirements utilizing at least one of physiological and behavioral characteristics.

12. A system for providing secure offline file access utilizing information rights management, comprising:
   an information rights management (IRM) server comprising a database of IRM-protected documents, and a document access manager for generating one or more consumption licenses for offline file access; and
   a user device comprising:
   a) at least one processor;
   b) at least one input device; and
   c) at least one storage device storing processor executable instructions which, when executed by the at least one processor, perform a method to:

store one or more IRM-protected documents in a secure local storage on a user device;

store the one or more consumption licenses associated with the one or more IRM-protected documents in the secure local storage on the user device, wherein the one or more consumption licenses is required to access one or more IRM-protected documents;

detect a loss of network connectivity on the user device;

in response to detecting the loss of network connectivity, write the one or more consumption licenses to an IRM location in memory on the user device;

receive a request to open a document of the one or more IRM-protected documents during the loss of network connectivity;

read the consumption license from the IRM location in memory; and enable access to the requested IRM-protected document based on the consumption license.

13. The system of claim 12, wherein the processor executable instructions further perform a method comprising:

authenticating a user on a user device when the user device has network connectivity;

scanning one or more IRM-protected documents on the user device for embedded user licenses;

transmitting the one or more user licenses to an IRM server, wherein the one or more user licenses are encrypted and compressed into a single data unit;

receiving one or more consumption licenses from the IRM server, wherein each of the one or more consumption licenses corresponds to one document of the one or more IRM-protected documents; and storing the one or more received consumption licenses in a local storage on the user device.

14. The system of claim 12, wherein the processor executable instructions further perform a method comprising:

detecting that network connectivity has been regained on the user device;

deleting the one or more consumption licenses from an IRM location in memory on the user device;

receiving a request to open a document of the one or more IRM-protected documents;

transmitting a request for a consumption license from an IRM server;

receiving an updated consumption license from the IRM server; and enabling access to the requested IRM-protected document based on the updated consumption license.

15. The system of claim 12, further comprising an external user device for user identification when a consumption license is associated with offline access through multifactor authentication, wherein the consumption license identifies additional user verification requirements utilizing the external user device.

16. The system of claim 12, wherein the consumption license provides one of a lease time for offline access or a set expiration time for access to the IRM-protected document.

17. The system of claim 12, wherein the consumption license is associated with offline multifactor authentication, wherein the consumption license identifies additional user verification requirements utilizing at least one of physiological and behavioral characteristics.

18. A non-transitory computer readable medium for storing computer instructions that, when executed by at least one processor causes the at least one processor to perform a method for providing secure offline file access utilizing information rights management (IRM), comprising:

storing one or more IRM-protected documents in a secure local storage on a user device;

storing one or more consumption licenses associated with the one or more IRM-protected documents in the secure local storage on the user device, wherein the one or more consumption licenses is required to access one or more IRM-protected documents;

detecting a loss of network connectivity on the user device;

in response to detecting the loss of network connectivity, writing the one or more consumption licenses to an IRM location in memory on the user device;

receiving a request to open a document of the one or more IRM-protected documents during the loss of network connectivity;

reading the consumption license from the IRM location in memory; and enabling access to the requested IRM-protected document based on the consumption license.

19. The non-transitory computer readable medium of claim 18, further comprising:

authenticating a user on a user device when the user device has network connectivity;

scanning one or more IRM-protected documents on the user device for embedded user licenses;

transmitting the one or more user licenses to an IRM server, wherein the one or more user licenses are encrypted and compressed into a single data unit;

receiving one or more consumption licenses from the IRM server, wherein each of the one or more consumption licenses corresponds to one document of the one or more IRM-protected documents; and storing the one or more consumption licenses in a local storage on the user device.

20. The non-transitory computer readable medium of claim 18, further comprising:

detecting that network connectivity has been regained on the user device;

deleting the one or more consumption licenses from an IRM location in memory on the user device;

receiving a request to open a document of the one or more IRM-protected documents;

transmitting a request for a consumption license from an IRM server;

receiving an updated consumption license from the IRM server; and enabling access to the requested IRM-protected document based on the updated consumption license.

* * * * *